United States Patent Office 3,786,130
Patented Jan. 15, 1974

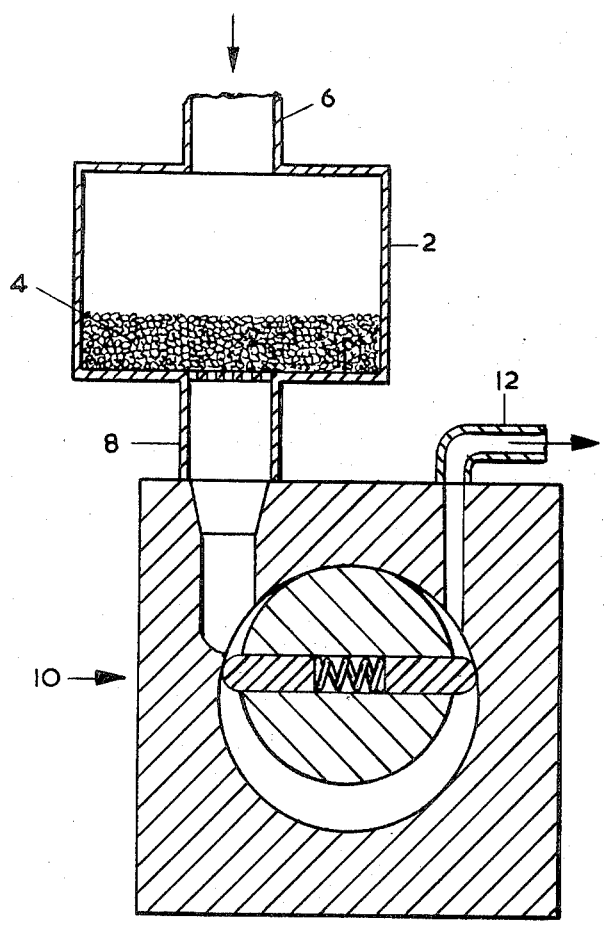

3,786,130
VACUUM APPARATUS
Malcolm Arthur Baker, Crawley, England, assignor to The British Oxygen Co. Ltd., London, England
Filed June 23, 1971, Ser. No. 156,123
Claims priority, application Great Britain, June 24, 1970, 30,663/70
Int. Cl. B01d *53/34;* F04b *37/02*
U.S. Cl. 423—245
6 Claims

ABSTRACT OF THE DISCLOSURE

Hydrocarbon molecules present in gas being evacuated from a housing by a pump, or leaking back into the housing from the pump, are permanently removed by passing the gas in intimate contact with a chemisorption agent at or above room temperature.

---

This invention relates to vacuum apparatus including means for sorbing hydrocarbons present in the gas being pumped and method of chemisorbing hydrocarbons therein.

The present invention aims at providing vacuum apparatus and method in which hydrocarbons present in the gas being pumped are converted at room temperature into non-volatile materials so that they are effectively removed from the apparatus. Accordingly the present invention provides vacuum apparatus and method which are as claimed in the appended claims.

The present invention will now be described in further detail by way of example with reference to the accompanying drawing which is a diagrammatic representation of a sorption trap of the present invention in combination with a rotary vacuum pump.

When producing (high) vacua it is generally necessary to carry out a "rough-pumping" operation prior to "fine pumping" by diffusion, getter-ion, cryo or turbomolecular pumps. The rough-pumping operation is most conveniently carried out by oil-sealed mechanical vacuum pumps. Such pumps have high compression ratios and are capable of reducing the gas pressure in a system from atmosphere (760 torr) to between $1\times10^{-2}$ and $10^{-3}$ torr. Although the oil-sealed mechanical pump is largely efficient in this function, it is also a source of highly-undesirable organic contaminants, and its efficiency in the $1\times10^{-2}$ torr region may be impaired by the presence of hydrocarbon vapor. As the mechanical pumping proceeds and the system pressure falls below 1 torr organic vapor released from the pump is increasingly able to flow ("backstream") from the mechanical pump into the "fine" pumps and vacuum system.

It is therefore desirable to remove or "trap" the organic vapor (molecules) before it can proceed to the fine pumps or vacuum system.

Trapping devices for this purpose are well known in the prior art. They are of several basic types:

(1) Adsorption (physisorption).—Oil vapor molecules striking a physisorbent material of high surface area, e.g. activated charcoal, activated alumina and zeolites, are held there by various short-range bonding forces constituting what is generally known as physical adsorption. Hydrocarbon reduction efficiency by these traps can be as high as 99.5%.

(2) Low temperature or "cryogenic."—Such traps rely on the local condensation of the hydrocarbon vapor. Liquid nitrogen is commonly used for cooling but even at this temperature (−195.8° C.) methane is not effectively condensed under vacuum. The efficiency of this type of trap can also be as high as 99.5% but if cooling is halted the accumulated condensed or frozen hydrocarbons are released into the gas phase.

(3) Electric.—In these traps the oil molecules are bombarded in a suitable electric discharge. The hydrocarbons are polymerized etc. and eventually reduced to a deposit of carbon in the trap. This type of trap is typically 98% efficient but is ineffective in trapping methane, hydrogen and other low molecular weight hydrocarbon molecules.

Traps of the physisorption type are the most widely used for reasons of convenience and economy, but they suffer from several defects resulting from the strong physisorption of water vapor.

For some adsorbents in particular the zeolites, physical adsorption of water vapor is so strong that previously-trapped oil molecules are displaced back into the gas phase, and the trap becomes ineffective. A further defect is that during a normal pump-down cycle, atmospheric water vapor is effectively adsorbed in the trap from the ambient air. The subsequent release of this water vapor at low pressure affects the ultimate performance of the mechanical pump, making it difficult, and sometimes impossible, to operate the fine pumps mentioned above.

In accordance with the present invention an alternative form of acting trapping material is used. This, in the form of a high surface area material, performs its trapping function by promoting bonds of a chemical nature between itself and the incident hydrocarbon molecules, thus permanently removing the hydrocarbon molecules from the gas phase. This process is referred to in this specification as "chemisorption."

Preferred chemisorption materials are active metallic agents, such as palladium, platinum or nickel, which are known to form chemical bonds with incident hydrocarbon molecules, including those of low molecular weight such as methane. It is also possible for the incident molecules to form higher molecular weight, polymerization products by the formation of cross-linking bonds induced after chemisorption on the active metal agent. The active metal agent preferably has its surface area made as large as possible to facilitate its interaction with the incident hydrocarbon molecules; to make as large as possible the number of active sites available for chemisorption of hydrocarbon molecules, and to give long working life to the trapping material by having very large surface area to weight ratios. The surface area of the metal may be "extended" by being deposited by any suitable process on a porous or fibrous support of suitable material. A suitable support may be a metal "sponge" made from an alloy, or it may be in the form of a non-metallic inert material such as kieselguhr, benonite or other diatomaceous earth, of which the component particles are given a very thin layer of chemisorption agent by any suitable process which does not in itself form part of the subject-matter of this invention.

One disadvantage of using nickel in a finely-divided state, giving a high surface area, is that it tends under these circumstances to be pyrophoric. Such a tendency is inhibited by including known stabilizers in the nickel used in sorption traps of the present invention.

It is a further embodiment of the invention that the temperature of the chemisorption agent may be raised above ambient by any suitable means of heating. Elevation of the temperature is likely to increase the hydrocarbon chemisorption efficiency whilst decreasing the likelihood of physisorption of water vapor.

The chemisorption of unwanted hydrocarbon molecules is improved by positioning the trap so that any hydrocarbon molecules backstreaming from an associated mechanical oil-sealed vacuum pump are likely to come into contact with the chemisorption agent. This is shown in the accompanying drawing, in which a container 2 of the chemisorption agent 4 is in communication through an inlet 6 with the system being evacuated. All the gas entering the container 2 is forced to flow through a bed of the agent before entering a conduit 8 leading to the inlet of a mechanical oil-sealed pump 10. The pump exhausts through an outlet 12 directly to atmosphere.

In one example of the present invention the agent 4 took the form of nickel pellets or balls of very high surface area. The container and its contents were maintained (by means which are not shown) at a temperature of about 200° C. It was found that the trapping efficiency, for the hydrocarbons usually emitted from mechanical oil-sealed vacuum pumps, was at least 99.5%. The chemical bonds between the molecules and the trapping agent were also "permanent" in the sense used in this specification, in that the molecules were not released into the gas phase during subsequent normal usage.

One preferred support for the sorption material is a porous carbon material, such as that sold under the trade name "Sigratherm." The sorption material, preferably metallic nickel, is deposited on the carbon in any suitable manner which results in the final product being porous. The product is positioned so that gas bearing the hydrocarbonaceous contaminants is forced to flow through it. As it does so, the hydrocarbons are polymerized or otherwise chemically acted upon to bond them to the sorption material.

A particular advantage of using porous carbon is that it has a finite electrical resistance. This means that it can be heated by passing electricity through it. By these means it can be heated to a temperature such that the chemisorption properties of the nickel or other sorption material are enhanced, while their physisorption properties are inhibited.

Although porous carbon is preferred as a support, it is within the purview of the present invention to use carbon in any other physical form having a large surface area, such as carbon fibres. These may be simply assembled together to form a ply of parallel fibres, or they may be woven together to form an electroconductive cloth, the pores in which are sufficiently large to permit the cloth to act as a filter for the contaminated air or other gas.

The sorption traps of the present invention are distinguished from known physisorption traps in that the sorption mechanism is predominantly chemisorptive; from known cryogenic traps in that the present trap is intended to work at or above room temperature, with no special cooling means provided, and from known electrical traps in that, if electricity is used at all in traps of the present invention, it is only to generate Joule heat and not deflecting fields for the contaminating molecules.

I claim:

1. Vacuum apparatus including as the only trapping means for chemisorbing hydrocarbons in a gas being pumped, to convert said hydrocarbons into non-volatile materials, in which the chemisorbing means is palladium, platinum, or nickel, effective to trap and permanently remove the hydrocarbons from said gas in which the chemisorption material is supported on a material of very high surface area through which gas bearing hydrocarbons are intended to pass.

2. Vacuum apparatus as claimed in claim 1, in which the support material is in the form of a metal sponge made from an alloy.

3. Vacuum apparatus as claimed in claim 1 in which the support material is a diatomaceous earth in the form of a non-metallic and non-electro conductive material.

4. Vacuum apparatus as claimed in claim 3, in which the support material is kieselguhr or bentonite.

5. Vacuum apparatus including as the only trapping means for chemisorbing hydrocarbons in a gas being pumped, to convert said hydrocarbons into non-volatile materials in which the chemisorbing means is nickel, to trap and permanently remove the hydrocarbons from said gas.

6. A method of chemisorbing hydrocarbons in a gas being pumped in a vacuum system consisting of trapping said hydrocarbons at from room temperature to about 200° C. in high surface area palladium, platinum or nickel to convert said hydrocarbons into non-volatile materials and permanently remove the hydrocarbons from the gas.

References Cited
UNITED STATES PATENTS

| | | | |
|---|---|---|---|
| 3,214,245 | 10/1965 | Peters, Jr. | 23—252 R |
| 2,624,421 | 1/1953 | Savage | 23—25 X |
| 2,850,225 | 9/1958 | Herb | 417—49 |
| 3,134,533 | 5/1964 | Kienel | 417—49 |
| 3,221,197 | 11/1965 | Coppola | 417—51 X |
| 3,497,674 | 2/1970 | Zirngibl et al. | 23—252 UX |

JOSEPH SCOVRONEK, Primary Examiner

U.S. Cl. X.R.

23—252 R; 55—387; 141—65; 417—51